Sept. 20, 1971  E. E. HOFFMANN  3,605,178
LOIN PULLING KNIFE

Filed Jan. 16, 1970  2 Sheets-Sheet 1

United States Patent Office 3,605,178
Patented Sept. 20, 1971

3,605,178
LOIN PULLING KNIFE
Edwin E. Hoffmann, 44 Otis Ave.,
St. Paul, Minn. 55104
Filed Jan. 16, 1970, Ser. No. 3,339
Int. Cl. A22c 17/00
U.S. Cl. 17—1G     4 Claims

ABSTRACT OF THE DISCLOSURE

A blade is bent into generally U-shaped form to separate the loin from the belly and fatback of a hog. The blade is sharply bent along a short radius at its point of entry through the scribe line so as to cut through the serratus dorsalis muscle.

This invention relates to an improvement in loin knives, and deals particularly with a device which may be termed a scribe extender and loin separating device.

BACKGROUND OF THE INVENTION

The value of a bacon slab or hog belly is determined by its size or weight, and that size is confined by certain limiting specifications. These specifications may vary from one packer to another, but in general all conform to standards set by the Board of Trade in Chicago. This is done so that packers having a surplus of bellies, or those needing more than they have available, can sell or order them through a broker and all parties concerned will know what is being traded. One of the criteria of belly separating is the amount of extension that can be left on the belly. The scribe line is the saw mark through the ribs, and the extension is that part of the belly toward the fatback side. On slicing bellies that extension is limited to one and one-half to two inches in width. A further stipulation is that it cannot have over one-half inch of clear fat exposed along the fatback side. It follows that the more lean that can be left on the extension, the wider the extension can be (up to two inches) and the more the belly will weigh and be worth.

Prior to the present invention, the only tools available to remove lions have been in the form of a curved pulling knife of the type shown in the Wilder Pat. No. 431,097 designed before 1890 for the purpose of expediting the loin removal from the side. Any attempt to improve scribe extensions with this knife had the result of taking excess fat from the loin.

SUMMARY OF THE INVENTION

I have found that by changing the contour of the cutting blade, better results may be obtained. One side of the blade must pass through the scribe line in order to cut through the side and remove the loin. A muscle known as the serratus dorsalis muscle lies inwardly of the scribe line and is elongated in a generally right angular relation thereto. The curved blade of the Wilder patent above referred to cuts through this muscle in a direction generally transverse of the length of the muscle. I have found that by forming the knife with a generally vertical side, and bending the blade at the lower end of this vertical side at a relatively short radius, through an angle of about ninety degrees, the resulting horizontal adjoining portion of the blade will extend longitudinally of the serratus dorsalis muscle, thus greatly increasing the length of the exposed red meat. This results in an increased length of belly acceptable under the Board of Trade standards. The difference in the width of the belly may be increased by an inch or more by cutting through the serratus dorsalis muscle lengthwise rather than generally transversely as in the past.

With the continuously curved blade previously used, the more the blade was tilted or included to increase the length of the serratus dorsalis muscle cut by the knife, the nearer the other rounded side of the blade came to the loin eye. Pork loins are also sold by weight; and as the thickness of the fat layer decreases, the weight of the loin is correspondingly decreased. As the thickness of the fat layer increases, the weight of the relatively low cost fatback decreases. I have provided a knife which is curved to maintain a reasonable thickness of fat encircling the loin eye.

The knife which I have developed includes the generally vertical side curved at its lower end to provide a generally horizontally extending serratus dorsalis muscle bisecting portion, a reversely curved portion at the end of the horizontal or right angularly extending portion, and a gradually curved second side extending almost vertically at its extremity. This long radius portion cut through the fatback leaving a reasonably thick layer of fat along the loin eye.

There are several advantages in the present design of knife as compared with the previous continuously curved blades. Certain of these advantages may be listed as follows:

(1) The loin has a lean appearance on the rib ends due to the exposure of one-half of the serratus dorsalis muscle which has been bisected. Most of the length of this muscle is usually covered with fat when cut in the conventional manner.

(2) The belly has a lean appearance on the scribe-extension due to one-half of the bisected serratus dorsalis muscle being exposed and intact. The length of muscle visible is multiplied several times.

(3) The loin yields are improved by having a better covering of fat over the loin eye.

(4) Belly yields are improved by leaving a wider lean covered scribe extension.

(5) The flexible construction of the blade allows all size hogs to be separated with one size of blade.

(6) Parts of the low value fatback are transferred to either of the relatively high value belly or the loin, thus materially increasing the cut out results.

DESCRIPTION OF THE DRAWINGS

In order to understand the purpose of the present invention, FIG. 4 is shown to indicate the cross-section of the pork loin, belly, and fatback portion of the carcass to be separated, the areas which are cross-hatched to indicate areas of lean. The conventional curved knives, such as that shown in the Wilder Patent referred to, were designed to simplify the separation of the pork loin from the hog belly and fatback. This knife was a definite improvement over the previous method of separating the loin and belly of the hog by normal knife separating, as considerable time was saved by drawing the curved knife through the meat, rather than by separating the loin by use of a straight blade. However, since 1900 when the Wilder Knife was known, many changes have been made in the regulations relating to the processing of meat. For example, the Chicago Board of Trade, as previously mentioned, specifies the allowable amount of fat exposed on the surface of the meat cuts. No more than one-half inch of clear fat may be exposed beyond the fatback side of the belly beyond the lean meat exposed.

Figure 4:
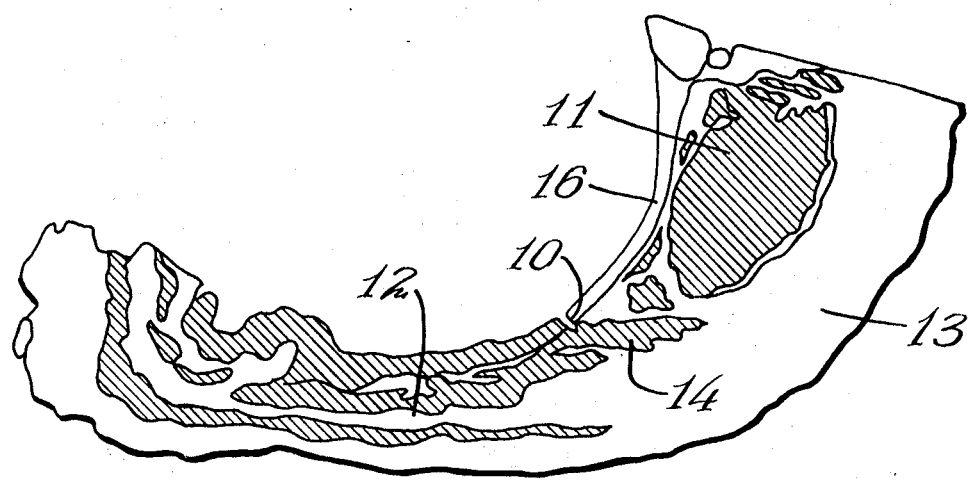
FIG. 4 is a diagrammatic sectional view through a loin, fatback and belly portion of a hog, showing the relationship of the parts being separated.

The section of the carcass shown in FIG. 4 shows the scribe line 10 or saw cut through the ribs generally between the loin eye 11 and the belly 12. The area indicated in general by the numeral 13 indicates the fatback portion which is entirely composed of fat, and which is accordingly a relatively low cost section as compared with the loin area and the belly portion 12 from which bacon is produced.

As shown in FIG. 4, there is what is known as a serratus dorsalis muscle which comprises red or lean meat, and which begins just inwardly of the scribe line and extends in a generally horizontal direction therefrom when the belly is resting upon a generally horizontal plane. This muscle is of a width which is several times its vertical height. This muscle 14 is normally cut through in a generally vertical direction by the curved knives which have been previously used. By properly shaping the knife, it may be used to cut through virtually the entire length of the serratus dorsalis muscle, greatly increasing the amount of exposed lean meat on the fatback side of the belly without sacrificing the thickness of the layer of fat encircling the loin eye.

Figure 1:
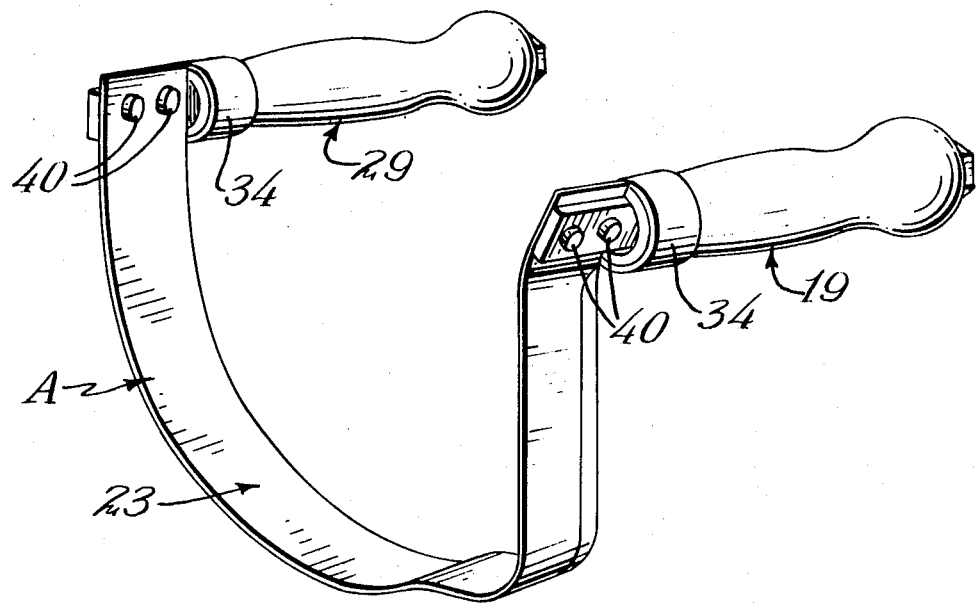
FIG. 1 is a perspective view of the loin knife in readiness for use.
Figure 2:
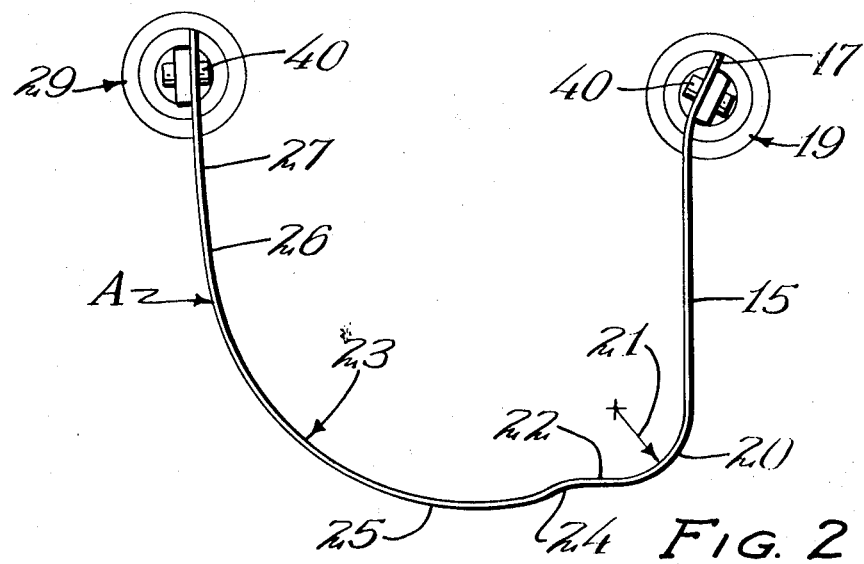
FIG. 2 is an end elevational view of the knife.
Figure 3:
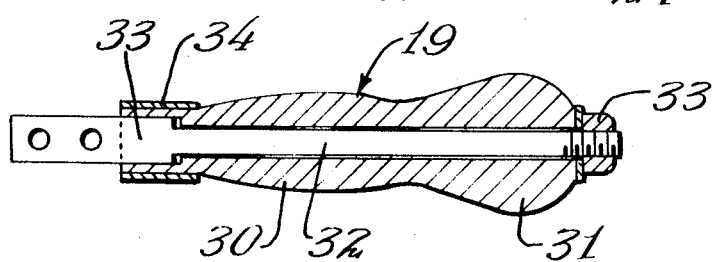
FIG. 3 is a sectional view through one of the handles.
Figure 5:
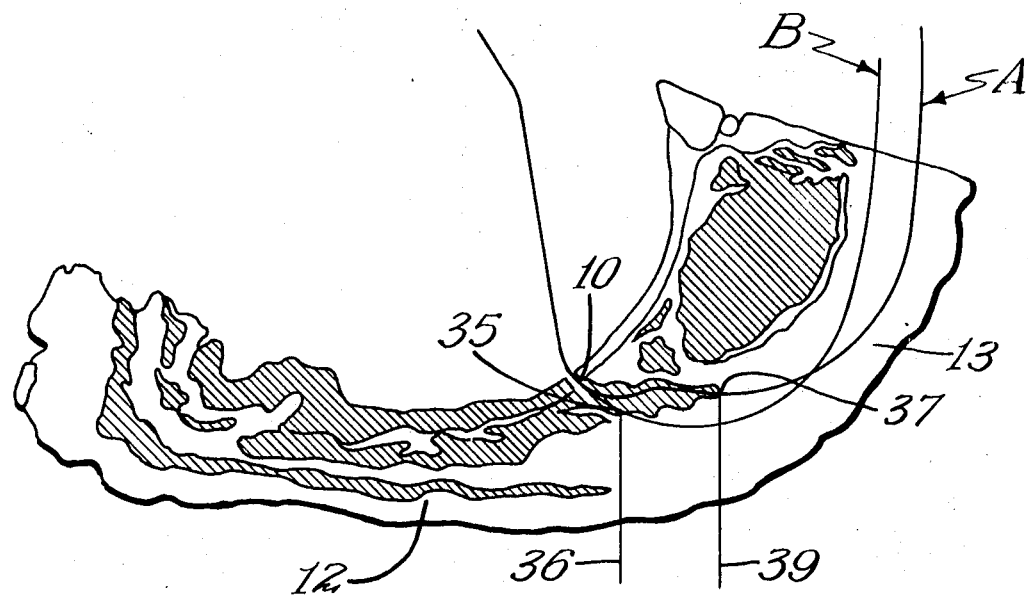
FIG. 5 is a diagrammatic view similar to FIG. 4 but showing position of the knife of the present invention as compared with the conventional type of loin knife.

By way of explanation, it should be stated that the section of pork illustrated in FIGS. 4 and 5 is taken from one side of the center of the belly; and a similar but reversed section is provided on the other side of the longitudinal center of the belly. As a result, the knives may be right handed or left handed, depending upon which section is being cut. The knife shown in FIGS. 1 and 2 are used for removing the loin from one side of the hog belly, while the knife shown in FIGS. 4 and 5 is for removing the opposite side. In view of the fact that the knives are identical but reversed, the same identifying numerals have been used.

The knife A includes a generally vertical side 15 designed to extend inwardly of the rib side of the section, the ribs being indicated in general by the numeral 16. The upper end of the knife side 15 is angled outwardly from the center of the knife, or inwardly from the ribs. This angled end 17 is designed for attachment to a handle 19 in a manner to be described.

The lower end of the generally vertical side 15 is curved as indicated at 20 on a short radius 21 which is about fifteen-sixteenth of an inch, and is connected at its lower end to a short horizontal section 22. The blade 23 of the knife A is then reversely curved on a relatively larger radius as indicated at 24, and then again reversely curved as indicated at 25, also on a relatively greater radius of curvature, such as, for example, three and one-half inches, through an angle of about 90 degrees. From this point 26, the blade gently slips toward the vertical, as indicated at 27.

The handle 19, as well as the handle 29 secured to the blade end 27, is usually a shaped handle member 30 of wood or plastic which is circular in cross-section. The handles 19 and 29 are generally parallel. The handle end 31 which is farthest from the blade is usually of increased diameter to prevent the hands from slipping from the ends of the handles. A handle shank 32 having a flattened end 33 extends axially through the handle member 30 and is rivetted or otherwise secured to the blade ends 17 and 27 as indicated at 40. The handle members 30 are secured to the handle shanks 32 by nuts 33 or the like. A ferrule 34 may encircle the attached ends of the handle members 30 to prevent splitting.

FIG. 5 indicates the difference between conventional blades such as B and the present form of blade A. As will be noted, the conventional blade B is continuously curved from one end to the other. The blade B passes through the scribe mark 10, and extends through the serratus dorsalis muscle transversely or in a generally vertical direction. The allowable scribe extension from the point of exposure 35 of lean meat toward the fatback section is limited to from one end and one-half to two inches, so that the length of the belly permissible is indicated by the line 36. In view of the relatively large radius of curvature of the knife B, the allowable length of the belly portion 12 is relatively short.

With the knife A, the relatively short radius of the blade portion 20 permits the blade to pass through the scribe mark or saw cut 10, and then to extend longitudinally through the serratus dorsalis muscle 14 in a generally horizontal direction, leaving the lean meat portion at the point 37 as compared to the point 35 at which the blade B leaves this muscle. As a result, the width of the belly which may qualify under the rules may be extended to the line 39, reducing the amount of fatback and increasing the yield of the belly.

An examination of FIG. 5 of the drawings will show that the exposed area of the serratus dorsalis muscle may be increased by tilting the entire knife B in a counter clockwise direction, the scribe line serving as the fulcrum point. However, this causes the outer end of the blade being drawn through the fatback to swing nearer to the loin eye, removing more of the fat from the loin. Thus, an increase in the width of the belly could be obtained by reducing the thickness of the fat layer from the loin eye. This decreases the yield from the relatively expensive pork loin area, and also tends to remove the protective layer of fat encircling the loin eye.

What is claimed is:

1. A loin knife for use in separating a section of meat including a pork loin, a hog belly and fatback portion, the ribs including a scribe line adjoining one end of the serratus dorsalis muscle, the knife including:

a curved generally U-shaped blade adapted to separate the loin eye from the belly and fatback sections of a hog carcass, said blade including a curved area of relatively short radius adapted to extend through the scribe line and longitudinally through the serratus dorsalis muscle, a first reversely curved portion connected to said first curved area, a second reversely curved area connected to said first reversely curved area, handles on the ends of said blade extending in generally parallel relation.

2. The knife of claim 1 and in which the handles on the blade are substantially parallel.

3. The structure of claim 1 in which the blade includes a generally vertical side connected to said first mentioned curved area.

4. The structure of claim 1 and in which said first curved area has a radius of substantially slightly less than one inch.

References Cited

UNITED STATES PATENTS

| | | | |
|---|---|---|---|
| 431,097 | 7/1890 | Wilder | 17—1X |
| 2,337,236 | 12/1943 | Gamble | 30—272 |
| 2,962,752 | 12/1960 | Massengill | 17—1-G |

LUCIE H. LAUDENSLAGER, Primary Examiner

U.S. Cl. X.R.

30—272, 313; 146—203